June 12, 1945. G. H. AKLIN 2,378,170
TELEPHOTO LENS
Filed June 25, 1943
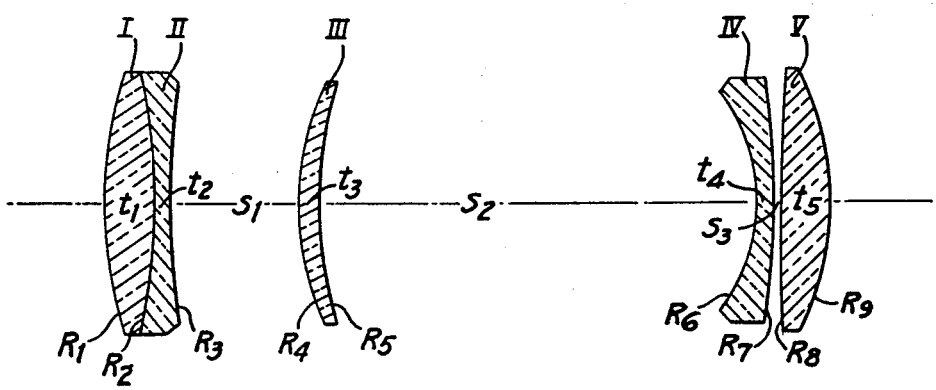
| F = 100 MM. | | B.F. = 39.0 | | f/5.6 |
|---|---|---|---|---|
| LENS | $N_D$ | $\nu$ | RADII | THICKNESSES |
| I | 1.573 | 57.4 | $R_1$ = +29.3 mm. | $t_1$ = 3.0 mm. |
| II | 1.617 | 36.6 | $R_2$ = −37.9 " | $t_2$ = 1.0 " |
|   |       |      | $R_3$ = +60.0 " | $S_1$ = 7.9 " |
| III | 1.541 | 59.9 | $R_4$ = +17.4 " | $t_3$ = 1.2 " |
|   |       |      | $R_5$ = +24.9 " | $S_2$ = 27.1 " |
| IV | 1.744 | 45.8 | $R_6$ = −11.0 " | $t_4$ = 1.0 " |
|   |       |      | $R_7$ = −91.3 " | $S_3$ = 0.5 " |
| V | 1.617 | 38.5 | $R_8$ = +227.5 " | $t_5$ = 2.8 " |
|   |       |      | $R_9$ = −17.7 " |   |
GEORGE H. AKLIN
INVENTOR
BY
ATTY & AGT Patented June 12, 1945

2,378,170

UNITED STATES PATENT OFFICE 2,378,170

TELEPHOTO LENS

George H. Aklin, Rochester, N. Y., assignor to Eastman Kodak Company, Rochester, N. Y., a corporation of New Jersey Application June 25, 1943, Serial No. 492,202

8 Claims. (Cl. 88—57)

This invention relates to optical systems and particularly to unsymmetrical optical systems consisting of a positive and a negative member such as telephoto objective lenses.

The object of the invention is to provide a means of simultaneously reducing the distortion and controlling the astigmatism in optical systems of that class.

A particular object of the invention is to provide a telephoto objective lens with corrected distortion and reduced astigmatism in addition to the high degree of correction of other aberrations usually found in the best lenses of this type.

By telephoto is meant that type of objective lens comprising a positive member in front and a negative member separated therefrom by more than about ⅕ the focal length of the system or by more than ⅓ the focal length of the positive member, the distribution of dioptric powers being such that both nodal points are in front of the front lens surface while the rear principal focal plane is behind the rear lens surface, the distance from the front lens surface to the rear principal focal plane being an inverse measure of the telephoto effect.

On account of the unsymmetrical arrangement telephoto objectives tend to suffer rather badly from pincushion distortion. Among various attempts to reduce or eliminate this aberration are those known arrangements wherein the negative member consists of a negative and a positive element slightly separated and with the former nearer the positive member of the system. These negative members are meniscus in outward form and concave toward the positive member, that is their front and rear surfaces are concave toward the positive member. The same features are used in connection with other types of unsymmetrical systems which are similar in that each comprises a negative member and a positive member separated by more than ⅓ the focal length of the latter and which suffer similarly from distortion.

While this general arrangement is successful in reducing or correcting distortion it has been found to introduce undesirable higher order coma and oblique spherical aberration (both of which are included in the term "rim ray aberrations") and to introduce more negative astigmatism than do negative members in which the two elements are cemented together.

I have found that the negative astigmatism can be reduced and the rim ray aberrations greatly improved in unsymmetrical systems having this type of negative member by making the negative element of a glass whose refractive index is greater than 1.72, and spacing it from the positive element by less than the thickness of the negative element. This spacing is very sensitive and should be between ⅕ and 1 times the thickness of the negative element.

My invention makes it possible to improve any unsymmetrical optical system of the class mentioned except in the unusual case where the system suffers from undercorrected astigmatism. Generally speaking, the invention works best in those systems in which the focal length of the positive member is greater than about 0.8 times that of the negative member.

In particular, I have been able to produce a superior distortionless telephoto objective by combining my negative member with a positive member of the type described in copending application Serial No. 440,291 by Schade, filed April 24, 1942. This positive member consists of two positive components spaced apart by between .04 F and .25 F where F is the equivalent focal length of the whole objective. The front surface of one or preferably both of the positive components is convex to the front.

In the preferred form of this embodiment of my invention the front component of the positive member consists of a cemented doublet and the rear component of said member is a simple lens element of which the index of refraction is between 1.50 and 1.65, while in the negative member the negative element is meniscus in shape and the radius of curvature of its front face is between ¹⁄₁₀₀ and ⅙ that of its rear face.

Preferably the space between the two members is between 2 and 5 times the space between the two positive components. If the latter space is too short, a too strongly meniscus negative element in the rear member is required to control the coma, and this leads to worse zonal spherical aberration. On the other hand if this space is too long it increases the length of the objective and decreases the illumination near the edge of the field. The optimum arrangement depends upon the conditions under which the objective is to be used, specifically the angular field it is to cover and the telephoto effect needed. I have found that a good state of correction is obtainable when the ratio of the distance between the positive components to the length of the objective is between one and three times the ratio of the radii of curvature of the rear negative element in the sense previously mentioned; i. e., $$\frac{S}{T}$$

is between one and three times $$\frac{R_6}{R_7}$$

where T is overall axial length of the lens.

The accompanying drawing shows a telephoto objective embodying my invention and the constructional data for a preferred form of the same. The constructional data are repeated here:

F=100 mm.   BF=39.0   f/5.6

| Lens | $N_D$ | V | Radii | Thicknesses |
|---|---|---|---|---|
| I | 1.573 | 57.4 | $R_1=+29.3$ mm. | $t_1=3.0$ mm. |
| II | 1.617 | 36.6 | $R_2=-37.9$ mm. | $t_2=1.0$ mm. |
|  |  |  | $R_3=+60.0$ mm. | $s_1=7.9$ mm. |
| III | 1.541 | 59.9 | $R_4=+17.4$ mm. | $t_3=1.2$ mm. |
|  |  |  | $R_5=+24.9$ mm. | $s_2=27.1$ mm. |
| IV | 1.744 | 45.8 | $R_6=-11.0$ mm. | $t_4=1.0$ mm. |
|  |  |  | $R_7=-91.3$ mm. | $s_3=0.5$ mm. |
| V | 1.617 | 38.5 | $R_8=+227.5$ mm. | $t_5=2.8$ mm. |
|  |  |  | $R_9=-17.7$ mm. |  |

This objective consists of a positive member, lenses I, II, and III, and a negative member, lenses IV and V, the two members being separated by 0.27 F. which is 3.4 times the space $s_1$ between the two positive components.

The embodiment of my invention disclosed in Schade's application is identical with the present example except that the air-space $s_3$ within the negative member is 0.9 mm. in the former and 0.5 mm. in the latter, both values falling within the preferred range from $\frac{1}{5}$ to 1 times the thickness of the negative element. When a lens was made and used it was found that a slight improvement in rim ray correction could be obtained by varying this space, while in neither case was there any distortion present that could be perceived by looking at a photograph taken with the objective.

All the other features of the invention are obvious in the table of data.

What I claim and desire to secure by Letters Patent of the United States is:

1. A telephoto objective consisting of a positive member and a negative member axially spaced therebehind by more than $\frac{1}{5}$ the focal length of the objective such that the nodal points are in front of the positive member and the rear principal focus is behind the negative member, said negative member being meniscus in outward form and concave to the front and consisting of a negative lens element spaced in front of a positive lens element, characterized by the index of refraction of the negative element being greater than 1.72, by its dispersive index being greater than that of the positive element and by the airspace within the negative member being less than the thickness of the negative element and greater than $\frac{1}{5}$ the thickness thereof.

2. A telephoto objective according to claim 1 in which the front member consists of two positive components whose front surfaces are convex and which are spaced apart by between .04 F and .25 F where F is the focal length of the objective.

3. A telephoto objective comprising a positive member and a negative member, the positive member consisting of two positive components convex toward the front separated by between .04 F and .25 F where F is the focal length of the objective and the negative member is spaced behind the positive member by between two and five times the airspace within the positive member and said negative member consists of a negative meniscus element concave toward the front with index of refraction greater than 1.72 and spaced in front of a positive element convex toward the rear, said space within the negative member being between 0.2 and 1.0 times the thickness of the negative element.

4. An objective according to claim 3 in which the radius of curvature of the front surface of the negative element is between $\frac{1}{100}$ and $\frac{1}{8}$ that of the rear surface thereof.

5. An objective according to claim 3 in which one component of the positive member is a cemented doublet while the other component is a single positive lens element with index of refraction between 1.50 and 1.65.

6. An objective according to claim 3 in which the ratio of the distance between the components of the front member to the length of the objective is between one and three times the ratio of the radius of curvature of the front surface of the negative meniscus element to the radius of curvature of the rear surface thereof.

7. A photographic objective constructed substantially according to the specifications in the following table:

| Lens | N | V | Radii | Thicknesses |
|---|---|---|---|---|
| I | 1.57 | 57. | $R_1=+0.3$ F | $t_1<.06$ F |
|  |  |  | $R_2<-1.0$ F | $t_2<.04$ F |
| II | 1.62 | 37. | $R_3=+0.6$ F | $S_1=.1$ F |
|  |  |  | $R_4=+0.2$ F | $t_3<.05$ F |
| III | 1.54 | 60. | $R_5=+0.25$F | $S_2=.3$ F |
|  |  |  | $R_6=-0.1$ F | $t_4<.04$ F |
| IV | 1.75 | 46. | $R_7=-0.9$ F$\frac{1}{3}$ | $t_4<S_3<t_4$ |
|  |  |  | $R_8=+2.3$ F | $t_5<.06$ F |
| V | 1.62 | 39. | $R_9=-0.2$ F |  | where the first column lists the lens elements in Roman numerals in order from front to rear, and where F is the focal length of the objective, N is the index of refraction for the D line of the spectrum, V is the dispersive index, R, t, and S refer respectively to the radii of curvature of the refractive surfaces, the axial thicknesses of the elements and the airspaces between the elements, the sub-scripts on these refer to the surfaces, the elements, and the spaces numbered consecutively from the front, and in the fourth column the sign $<$ pertains to absolute values and the $+$ and $-$ signs correspond to surfaces which are respectively convex and concave to the front.

8. An unsymmetrical optical system comprising a negative member axially spaced from a positive member by more than $\frac{1}{3}$ the focal length of the latter, said focal length being numerically greater than $\frac{4}{5}$ the focal length of the former, said spacing and focal lengths being such that the nodal points of the system lie on that side of the positive member which is remote from the negative member, the positive member comprising a plurality of lens elements including at least one of each sign of which the negative one has the lower dispersive index and the negative member consisting of a negative meniscus element with a refractive index greater than 1.72 facing and concave toward the positive member, and a positive element with dispersive and refractive indices respectively less than those of the negative meniscus element, spaced therefrom a distance less than the thickness of the negative meniscus element, the concave surface of the negative meniscus element having a radius of curvature between $\frac{1}{100}$ and $\frac{1}{8}$ that of the convex surface thereof, and the outer surface of the positive element being convex.

GEORGE H. AKLIN.